United States Patent [19]

Wright

[11] Patent Number: 5,118,237
[45] Date of Patent: Jun. 2, 1992

[54] QUICK APPLICATION/RELEASE NUT WITH ENGAGEMENT INDICATOR

[75] Inventor: Jay M. Wright, Alvin, Tex.

[73] Assignee: The United States of America as represented by the Administrator of the National Aeronautics and Space Administration, Washington, D.C.

[21] Appl. No.: 759,367

[22] Filed: Sep. 13, 1991

[51] Int. Cl.⁵ .............................................. F16B 37/08
[52] U.S. Cl. ...................... 411/433; 411/14; 411/267
[58] Field of Search .............. 411/267, 222, 237, 238, 411/266, 265, 303, 433, 432, 935, 8, 9, 10, 11, 12, 13, 14

[56] References Cited

U.S. PATENT DOCUMENTS

| | | | |
|---|---|---|---|
| 2,384,953 | 9/1945 | Miller | 411/266 X |
| 2,576,579 | 11/1951 | Donovan | 411/267 |
| 3,385,338 | 5/1968 | Morin | 151/19 |
| 4,378,187 | 3/1983 | Fullerton | 411/267 |

FOREIGN PATENT DOCUMENTS 1928490  5/1979  Fed. Rep. of Germany ...... 411/433

Primary Examiner—Rodney M. Lindsey
Attorney, Agent, or Firm—Russell E. Schlorff; John R. Manning; Edward K. Fein

[57] ABSTRACT

A composite nut is shown which permits a fastener to be inserted or removed from either side with an indicator of fastener engagement. The nut has a plurality of segments, preferably at least three segments, which are internally threaded, spring-loaded apart by an internal spring, and has detents on opposite sides which force the nut segments into operative engagement with a threaded member when pushed in and release the segments for quick insertion or removal of the nut when moved out. When the nut is installed, end pressure on one of the detents presses the nut segments into operative engagement with a threaded member where continued rotation locks the structure together with the detents depressed to indicate positive locking engagement of the nut. On removal, counterclockwise rotation of the nut relieves the endwise pressure on the detents permitting internal springs to force the detents outward and allowing the nut segments to move outward and separate to permit quick removal of the fastener.

18 Claims, 4 Drawing Sheets

QUICK APPLICATION/RELEASE NUT WITH ENGAGEMENT INDICATOR

ORIGIN OF THE INVENTION

The invention described herein was made by employee(s) of the United States Government and may be manufactured and used by or for the Government of the United States of America for governmental purposes without payment of any royalties thereon or therefor.

BACKGROUND OF THE INVENTION

1. Field of the Invention

This invention relates generally to quick application/release fasteners and more particularly to a nut that allows a fastener to be inserted or removed from either side by simply sliding the fastener in or out and includes a visual in dicator of positive engagement.

2. Brief Description of the Prior Art

Conventional nuts for fastening objects together have the disadvantage of requiring a large number of turns to position in a fully locked position. This may also involve the application of a considerable amount of torque. Mechanical operations in space, i.e., at low gravity, r problems which do not exist on earth. For example, when one applies torque, as in tightening a threaded nut or joint a countertorque is encountered against the worker (Newton's third law) which tends to rotate the worker around the object being torqued as much as to tighten the threaded joint.

In space activities by NASA or other space exploratory entities, an astronauts' time is valued at up to $100,000 per hour. The above-noticed problems have created a demand in astronautic activities to overcome both the physical problem caused by Newton's third law and the cost involved in the time required by the astronaut/worker in tightening a threaded joint or fastener.

A partial solution to the problems discussed above is the use of one of several known quick application nuts in making threaded assemblies.

There are several patents which disclose various types of quick application nuts for making threaded assemblies.

German Patent 1,928,490 discloses a nut which ensures rapid transversal of a spindle until a load is met. A sliding sleeve at the base of the nut is forced in as the nut contacts a surface at its base. The further movement of the sleeve inward forces threaded sections of the nut to be wedged into positive engagement with the screw spindle. The device includes springs that bias the threaded sections outward and apart, and a spring that presses the threaded sections down against the sleeve so that it extends out from the bottom of the nut.

Morin U.S. Pat. No. 3,385,338 discloses a lock nut structure having a threaded wedge member forced into positive engagement with the threads of a bolt as the lock nut is tightened. When the nut is positively engaged, the top of the wedge member protrudes from the top of the nut.

Fullerton U.S. Pat. No. 4,378,187 discloses a multifaceted casing having a wedge fit threaded jam nut for compressing into engagement on the threads of a bolt as the nut is tightened into a locked position.

These nuts or fasteners function satisfactorily on insertion or application of the quick-application nut but do not provide for both quick application and quick release, are not constructed for insertion from either side, and do not have a positive engagement indicator.

The present invention is distinguished over the prior art in general, and these patents in particular by providing a composite nut which permits a fastener to be inserted or removed from either side with an indicator of fastener engagement. The nut has plurality of segments, preferably at least three segments, which are internally threaded, spring-loaded apart by an internal spring, and has detents on opposite sides which force the nut segments into operative engagement with a threaded member when pushed in and release the segments for quick insertion or removal of the nut when moved out. When the nut is installed, end pressure on one of the detents presses the nut segments into operative engagement with a threaded member where continued rotation locks the structure together with the detents depressed to indicate positive locking engagement of the nut. On removal, counterclockwise rotation of the nut relieves the endwise pressure on the detents permitting internal springs to force the detents outward and allowing the nut segments to move outward and separate to permit quick removal of the fastener.

SUMMARY OF THE INVENTION

It is therefore an object of the present invention to provide a new and improved nut that allows a fastener to be quickly inserted or removed.

Another object of this invention is to provide a new and improved nut that allows a fastener to be quickly inserted or removed without extensive rotation.

It is another object of this invention is to provide a new and improved nut that allows a fastener to be inserted from either side by sliding the fastener in or out.

Another object of this invention is to provide a new improved nut that allows a fastener to be quickly inserted or removed from either side by sliding the fastener in or out.

Still another object of this invention is to provide a new and improved nut that allows a fastener to be inserted from either side by sliding the fastener in or out and which has means for effecting a positive engagement from either side.

Still another object of this invention is to provide a new and improved nut that allows a fastener to be inserted from either side by sliding the fastener in or out and which has means for effecting a positive engagement from either side which provides a visual indicator of positive engagement.

A further object of this invention is to provide an improved nut having a segmented structure for engaging and disengaging engaging threaded segments from a threaded spindle or shaft.

A further object of this invention is to provide an improved nut having a segmented structure for engaging and disengaging engaging threaded segments from a threaded spindle or shaft and locking means for releasing or securing the segments for continuing or discontinuing threaded engagement.

A further object of this invention is to provide an improved nut having a segmented structure for engaging and disengaging engaging threaded segments from a threaded spindle or shaft and locking means including detents operable from either end for releasing or securing the segments for continuing or discontinuing threaded engagement.

A further object of this invention is to provide an improved nut having a segmented structure for engaging and disengaging engaging threaded segments from a threaded spindle or shaft and locking means including detents operable from either end for releasing or securing the segments for continuing or discontinuing threaded engagement and providing a visual indicator of engagement or disengagement.

Other objects of the invention will become apparent from time to time throughout the specification and claims as hereinafter related.

The above noted objects and other objects of the invention are accomplished by a novel composite nut which permits a fastener to be inserted or removed from either side with an indicator of fastener engagement. The nut has plurality of segments, preferably at least three segments, which are internally threaded, spring-loaded apart by an internal spring, and has detents on opposite sides which force the nut segments into operative engagement with a threaded member when pushed in and release the segments for quick insertion or removal of the nut when moved out. When the nut is installed, end pressure on one of the detents presses the nut segments into operative engagement with a threaded member where continued rotation locks the structure together with the detents depressed to indicate positive locking engagement of the nut. On removal, counterclockwise rotation of the nut relieves the endwise pressure on the detents permitting internal springs to force the detents outward and allowing the nut segments to move outward and separate to permit quick removal of the fastener.

DESCRIPTION OF THE PREFERRED EMBODIMENT

Figure 1:
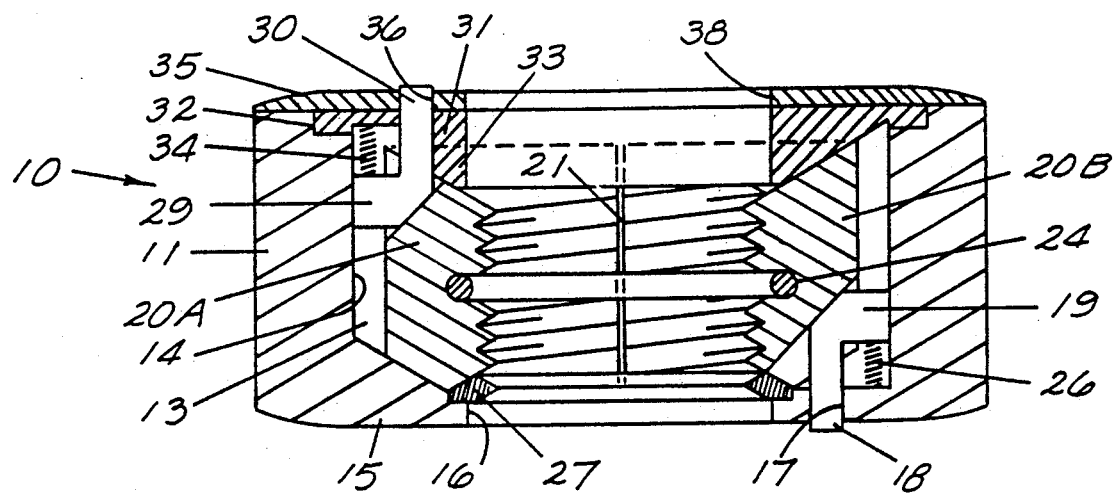
FIG. 1 is a sectional view, on the section line 1—1 of FIG. 2, of a quick application/release nut illustrating a preferred embodiment of this invention.
Figure 2:
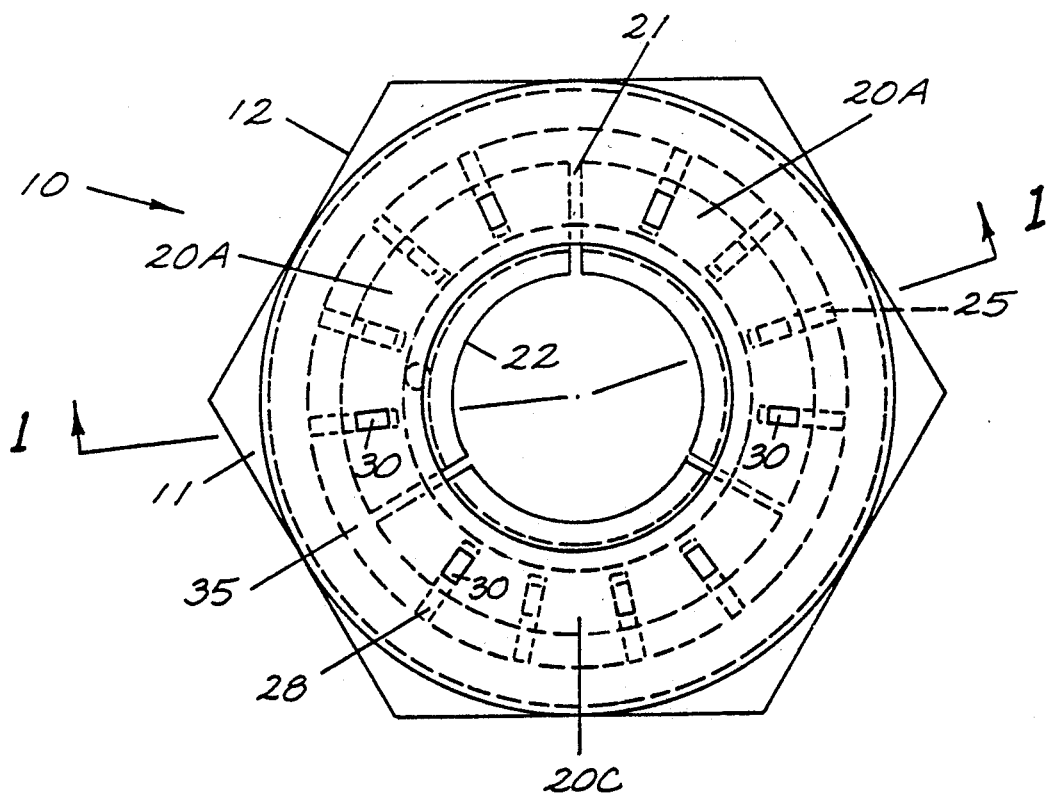
FIG. 2 is a top plan view of the embodiment of quick application/release nut shown in FIG. 1.
Figure 3:
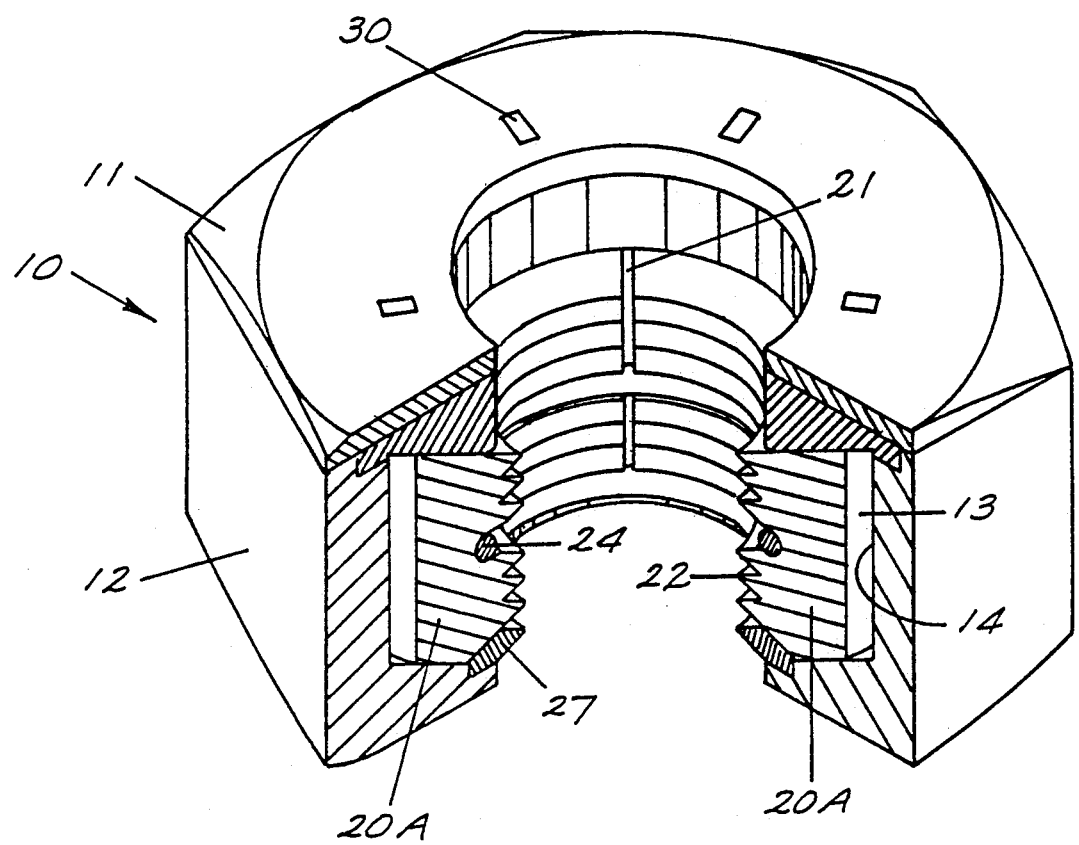
FIG. 3 is a front isometric view in partial section of the embodiment of quick application/release nut shown in FIG. 1.
Figure 4:
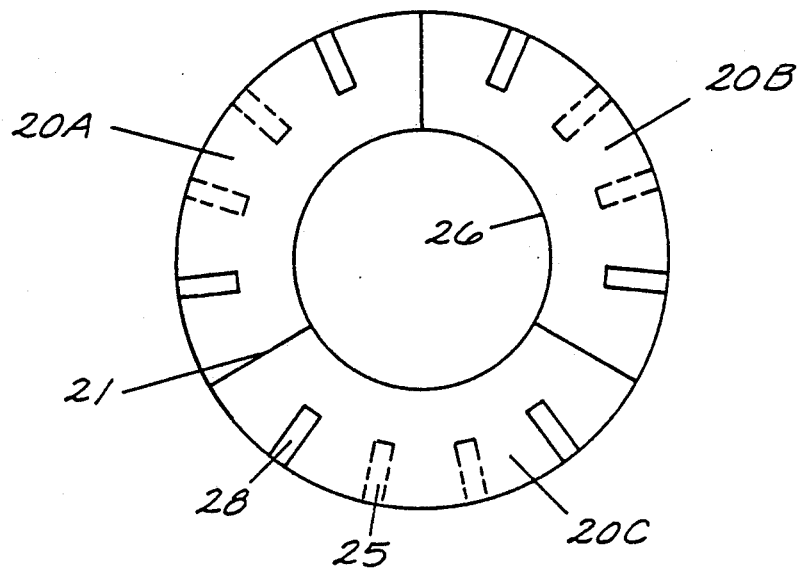
FIG. 4 is a top plan view of the multiple internally threaded segments used in the embodiment of quick application/release nut shown in FIG. 1.

Referring to the drawings by numerals of reference, there is shown a composite nut 10 which permits a fastener to be inserted or removed from either side and easily and quickly applied to or released from a threaded member such as a bolt, shaft, spindle, etc.

Composite nut 10 comprises a housing or body 11 which is multifaceted, preferably six facets 12, for application of torque by a wrench or other tool. Nut body 11 has an internal recess 13 formed by counterbore 14 with an end wall 15 and end opening 16 at one end. The other end of nut body 11 is partially closed as described below. End wall 15 has a plurality (preferably six) openings or slots 17 receiving the projecting ends 18 of lower detents 19.

Composite nut 10 has a plurality (preferably three or more) of threaded segments 20A, 20B and 20C having internal threads 21 which fit together to form a continuously internally threaded part movable between a closely abutting position and a position where the segments are separated by slots or spaces 22. The use of three or more of the segments 20A, 20B and 20C is preferred so that the internal threads 21 can engage or separate from a bolt, threaded shaft or spindle without binding.

Figure 5:
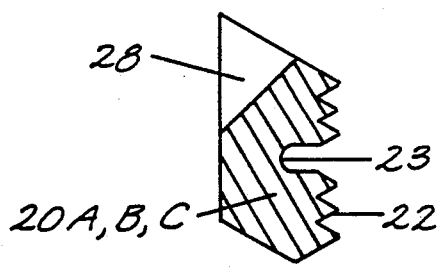
FIG. 5 is a sectional view of one of the internally threaded segments used in the embodiment of quick application/release nut shown in FIG. 1 showing the top slots for the operating detents.
Figure 6:
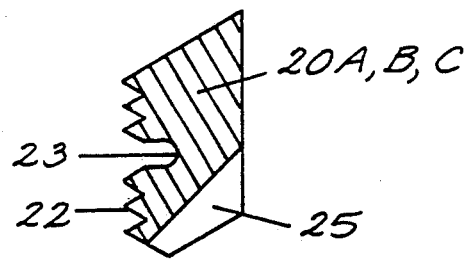
FIG. 6 is a sectional view of one of the internally threaded segments used in the embodiment of quick application/release nut shown in FIG. 1 showing the bottom slots for the operating detents.

Composite nut segments 20A, 20B and 20C each have an internal groove 23 (FIGS. 5 and 6) which when aligned forms a continuous peripheral groove receiving an expansion spring 24 urging the segments outward. Segments 20A, 20B and 20C have lower cam slots 25 which receive and fit over the lower detents 19. In FIG. 1, the assembly is shown with segments 20A, 20B and 20C positioned with cam slots 25 fitted over lower detents 19 with a spring 26 urging the detents 19 upward and the lower ends of the nut segments abutting end wall 15 and a rubber or elastomeric threaded stop washer 27.

Segments 20A, 20B and 20C have upper cam slots 28 which receive and fit over an upper set of detents 29. The upper detents 29 have upwardly projecting ends 30. An annular cap member 31 has its peripheral edge fitted into a peripheral face groove 32 in the upper end of nut body 11 and has a projecting hollow portion 33 abutting the upper ends of nut segments 20A, 20B and 20C. Upper springs 34 are positioned between upper detents 29 and cap member 31. An annular cover plate 35 is secured, as by welding, brazing or the like to the end of nut body 11 securing cap member 31 in place. Cover plate 35 and cap member 31 have aligned slots 36 and 37 receiving the projecting ends 30 of upper detents 29 and have aligned central openings 38 and 39 of substantially the same size as opening 16 in the other end.

OPERATION

While the operation of this invention should be obvious from the foregoing description, it will be restated for clarity.

When assembled as shown in FIG. 1, springs 26 and 34 urge detents 19 and 29 toward each other compressing nut segments 20A, 20B and 20C against the expansive force of spring 24 toward the position shown where the segments are nearly abutting along lines 21 and detent projecting ends 18 and 30 are fully retracted.

Figure 7:
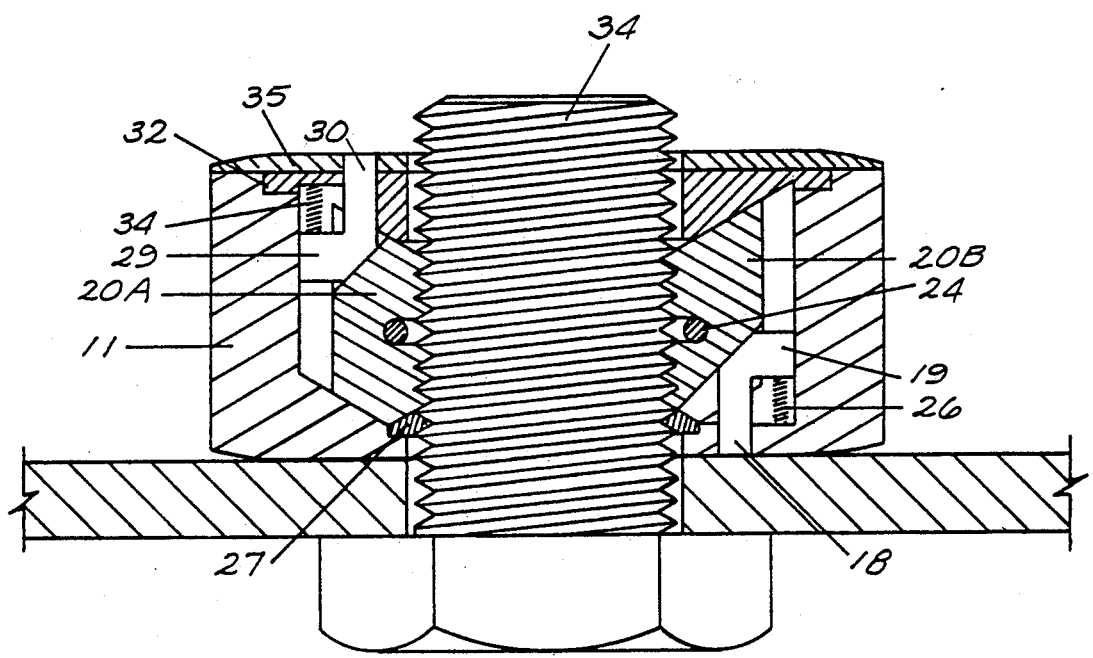
FIG. 7 is a sectional view, in longitudinal central section, of the embodiment shown in FIG. 1, with a bolt or threaded shaft or spindle inserted from one side of the nut.

The composite nut 10 may be installed on a threaded member 40, e.g., bolt, threaded shaft or spindle, from one side as shown in FIG. 7. As the composite nut 10 is slid over threaded member 40, the threaded member engages nut segments 20A, 20B and 20C and forces them outward sufficiently to allow the nut to slide freely. The outward movement of segments 20A, 20B and 20C against upper and lower cam slots 28 and 25 forces detents 19 and 29 away from each other and extends the projecting ends 18 and 30 out through the end slots 36, 37, and 17.

Figure 8:
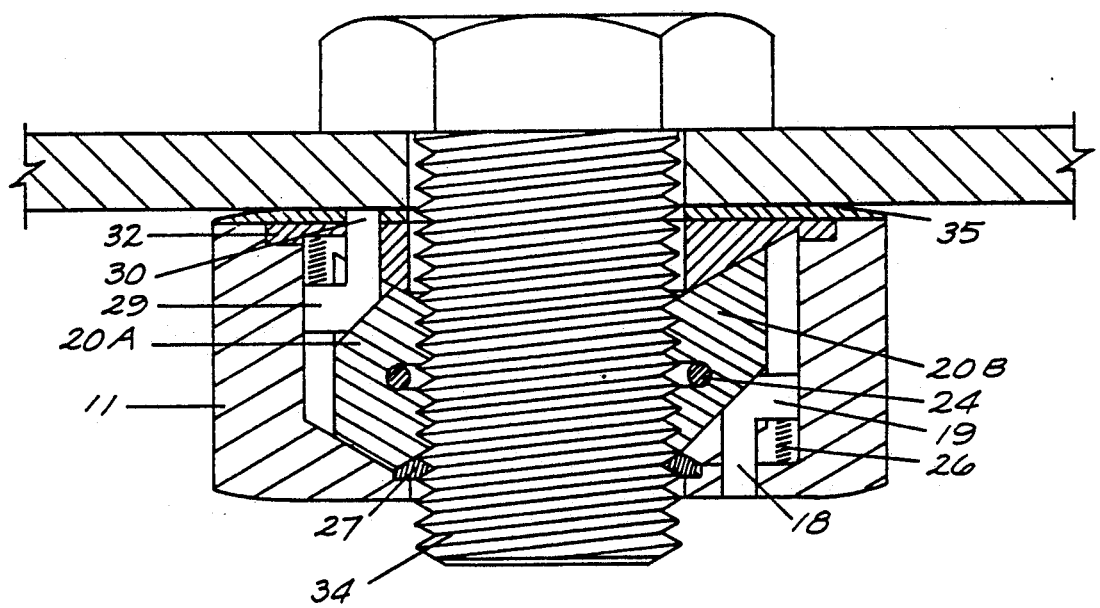
FIG. 8 is a sectional view, in longitudinal central section, of the embodiment shown in FIG. 1, with a bolt or threaded shaft or spindle inserted from another side of the nut.

When the composite nut 10 reaches and abuts the surface against which it is to fasten, the engagement of projecting ends 18 (in FIG. 7) or projecting ends 19 (in FIG. 8) forces detents 19 or 29 against cam slots 28 or 25 to move nut segments 20A, 20B and 20C together to fit around and threadedly engage the threads of threaded member 40. At that point, composite nut 10 can continue to be turned (by hand or by wrench or other tool depending on how tight the nut is to be tightened).

The inward movement of the projecting ends of the detents at one end of the nut allows the spring for the detents at the opposite end of the nut to move the projecting ends of those detents to a retracted position. When the nut 10 is completely installed and tightened, the full retraction of projecting ends 18 and 30 of the detents gives a visual indication that the nut is completely tightened. On releasing the nut 10 by counter-clockwise rotation, as the nut moves away from the surface against which the detent ends 18 or 30 were abutted, springs 26 and 34 force detents 19 and 29 toward each other allowing nut segments 20A, 29B and 20C to be moved outward by expansion spring 24 until the segments clear the threads of threaded member 40 and the nut can be slid off the threaded member for quick removal.

From this description of operation, it is seen that the nut 10 can be quickly inserted or removed from either side and that fasteners can be applied from either side. The structure provides a positive forced engagement of the threads 21 of the nut segments 20A, 20B and 20C. The ends of the detents provide a positive visual indication of the thread segments.

While this invention has been shown fully and completely with special emphasis on certain preferred embodiments, it should be understood that within the scope of the appended claims the invention may be practiced otherwise than as specifically described herein.

I claim:

1. A composite nut which can be quickly applied to or removed from a threaded member, comprising
    a plurality of segments movable between an inward, peripherally substantially abutting position and an outward, peripherally spaced position,
    said segments having threaded internal surfaces positioned to form a continuous internal thread when in said inward position and to be separated and discontinuous in said outward position,
    spring means cooperating with said segments to urge them toward said outward position,
    longitudinally movable means operable to engage and move said segments toward said inward position,
    said nut being installable from either side and slidably movable along a threaded member for installation thereon when said segments are in said outward position, and
    said longitudinally movable means being operated by engagement with a surface against which said nut is to be positioned to force said segments to said inward position to positively engage said segments and said continuous internal thread on said threaded member to permit continued installation of said nut by a torque-applying tool.

2. A Composite nut according to claim 1 in which said longitudinally movable means comprises at least one detent operable to engage and move said segments toward said inward position.

3. A composite nut according to claim 1 in which said longitudinally movable means comprises at least one detent having a projecting end engageable with a surface against which said nut is to be moved to move said detent to engage and move said segments toward said inward position.

4. A composite nut according to claim 1 in which said longitudinally movable means comprises at least one detent having a projecting end engageable with a surface against which said nut is to be moved to move said detent to engage and move said segments toward said inward position, and including
spring means engaging said detent to urge it toward engagement with said segments.

5. A composite nut according to claim 1 in which said longitudinally movable means comprises at least one detent having a projecting end engageable with a surface against which said nut is to be moved to move said detent to engage and move said segments toward said inward position, whereby
retraction of said projecting detent end provides a visual indication of positive engagement of said segments with the threaded member on which said nut is being applied.

6. A composite nut according to claim 1 in which said longitudinally movable means comprises a plurality of detents at opposite ends of said segments operable to engage and move said segments toward said inward position.

7. A composite nut according to claim 1 in which said longitudinally movable means comprises a plurality of detents at opposite ends of said segments each having a projecting end engageable with a surface against which said nut is to be moved to move said detents to engage and move said segments toward said inward position.

8. A composite nut according to claim 1 in which said longitudinally movable means comprises a plurality of detents at opposite ends of said segments each having a projecting end engageable with a surface against which said nut is to be moved to move said detents to engage and move said segments toward said inward position, and including
spring means engaging said detents at opposite ends to urge them toward each other for engagement with said segments.

9. A composite nut according to claim 1 in which said longitudinally movable means comprises a plurality of detents at opposite ends of said segments each having a projecting end engageable with a surface against which said nut is to be moved to move said detents to engage and move said segments toward said inward position, whereby
retraction of said projecting detent ends provides a visual indication of positive engagement of said segments with the threaded member on which said nut is being applied.

10. A composite nut according to claim 1 in which said longitudinally movable means comprises a plurality of detents at opposite ends of said segments each having a projecting end engageable with a surface against which said nut is to be moved to move said detents to engage and move said segments toward said inward position
whereby said nut may be applied or removed from either side, and retraction of said projecting detent ends provides a visual indication of positive engagement of said segments with the threaded member on which said nut is being applied.

11. A composite nut according to claim 1 in which said longitudinally movable means comprises a plurality of detents at opposite ends of said segments each having a projecting end engageable with a surface against which said nut is to be moved to move said detents to engage and move said segments toward said inward position, whereby said nut may be applied or removed from either side, retraction of said projecting detent ends provides a visual indication of positive engagement of said segments with the threaded member on which said nut is being applied, and including spring means engaging said detents at opposite ends to urge them toward each other for engagement with said segments.

12. A composite nut according to claim 1 in which said longitudinally movable means comprises a plurality of detents at opposite ends of said segments each having a projecting end engageable with a surface against which said nut is to be moved to move said detents to engage and move said segments toward said inward position, and said detents and said segments having cooperating inclined surfaces operable to move said segments inward and outward on longitudinal movement of said detents.

13. A composite nut according to claim 1 in which said longitudinally movable means comprises a plurality of detents at opposite ends of said segments each having a projecting end engageable with a surface against which said nut is to be moved to move said detents to engage and move said segments toward said inward position said detents and said segments having cooperating inclined surfaces operable to move said segments inward and outward on longitudinal movement of said detents, whereby said nut may be applied or removed from either side, and retraction of said projecting detent ends provides a visual indication of positive engagement of said segments with the threaded member on which said nut is being applied.

14. A composite nut which can be quickly applied to or removed from a threaded member from either end of said nut, comprising a nut having an internal recess, end closures, and openings in said end closures of a size permitting entrance of said threaded member on which said nut is to be applied, a plurality of segments positioned in said recess movable between an inward, peripherally substantially abutting position and an outward, peripherally spaced position, said segments having threaded internal surfaces positioned to form a continuous internal thread in said inward position and to be discontinuous in said outward position, first spring means cooperating with said segments to urge them toward said outward position, longitudinally movable means operable to engage and move said segments toward said inward position on engagement with a surface against which said nut is to be moved, second spring means engaging said longitudinally movable means to urge them toward engagement with said segments, said nut being installable from either side and slidably movable along a threaded member for installation thereon when said segments are in said outward position, and said longitudinally movable means are engageable with a surface against which said nut is to be positioned to force said segments to said inward position to positively engage said continuous internal thread on said threaded member to permit continued installation of said nut by a torque-applying tool.

15. A composite nut according to claim 14 in which said longitudinally movable means comprising a plurality of detents at opposite ends of said segments operable to engage and move said segments toward said inward position, said detents each having a projecting end retractable into said nut body and extendible therefrom for engagement with a surface against which said nut is to be moved to move said detents to engage and move said segments toward said inward position, and said second spring means engaging said detents to urge them toward each other to move said segments to said inward position to positively engage said continuous internal thread on said threaded member to permit continued installation of said nut by a torque-applying tool.

16. A composite nut according to claim 14 in which said longitudinally movable means comprising a plurality of detents at opposite ends of said segments operable to engage and move said segments toward said inward position, said detents each having a projecting end retractable into said nut body and extendible therefrom for engagement with a surface against which said nut is to be moved to move said detents to engage and move said segments toward said inward position, and said second spring means engaging said detents to urge them toward each other to move said segments to said inward position to positively engage said continuous internal thread on said threaded member to permit continued installation of said nut by a torque-applying tool, whereby said nut may be applied or removed from either side, and retraction of said projecting detent ends provides a visual indication of positive engagement of said segments with the threaded member on which said nut is being applied.

17. A composite nut according to claim 14 in which said longitudinally movable means comprising a plurality of detents at opposite ends of said segments operable to engage and move said segments toward said inward position, said detents each having a projecting end retractable into said nut body and extendible therefrom for engagement with a surface against which said nut is to be moved to move said detents to engage and move said segments toward said inward position, and on removal, counterclockwise rotation of said nut relieves endwise pressure on said detents to allow said segments to separate under pressure of said first spring means, and said second spring means engaging said detents to urge them toward each other to move said segments to said inward position to positively engage said continuous internal thread on said threaded member to permit continued installation of said nut by a torque-applying tool, whereby said nut may be applied or removed from either side, and retraction of said projecting detent ends provides a visual indication of positive engagement of said segments with the threaded member on which said nut is being applied.

18. A composite nut according to claim 14 in which said longitudinally movable means comprising a plurality of detents at opposite ends of said segments operable to engage and move said segments toward said inward position, said detents each having a projecting end retractable into said nut body and extendible therefrom for engagement with a surface against which said nut is to be moved to move said detents to engage and move said segments toward said inward position, and on removal, counterclockwise rotation of said nut relieves endwise pressure on said detents to allow said segments to separate under pressure of said first spring means, said segments have cam slots with inclined surfaces into which said detents are positioned, said detents each have inclined surfaces operable to engage said cam slots and move said segments toward said inward position on longitudinal movement of said detents by engagement with a surface against which said nut is moved, and said second spring means engaging said detents to urge them toward each other to move said segments to said inward position to positively engage said continuous internal thread on said threaded member to permit continued installation of said nut by a torque-applying tool, whereby said nut may be applied or removed from either side, and retraction of said projecting detent ends provides a visual indication of positive engagement of said segments with the threaded member on which said nut is being applied.

* * * * *